United States Patent [19]
Zimin, Sr. et al.

[11] Patent Number: 5,603,735
[45] Date of Patent: Feb. 18, 1997

[54] WATER-REDUCIBLE DYE COMPOSITIONS COMPRISING SOLVENT DYES AND CITRUS SOLVENTS

[75] Inventors: Alejandro Zimin, Sr., Wayne; Peter A. Caputo, South Orange, both of N.J.

[73] Assignee: Morton International, Inc., Chicago, Ill.

[21] Appl. No.: 445,230

[22] Filed: May 19, 1995

Related U.S. Application Data

[63] Continuation-in-part of Ser. No. 214,334, Mar. 16, 1994, abandoned, which is a continuation-in-part of Ser. No. 63,833, May 18, 1993, abandoned.

[51] Int. Cl.$^6$ .............................. C09B 67/10; C09B 67/44
[52] U.S. Cl. ..................... 8/617; 8/661; 8/662; 8/675; 8/907; 8/938
[58] Field of Search .............................. 8/617, 661, 662, 8/675, 907, 687, 938

[56] References Cited

U.S. PATENT DOCUMENTS

| 3,533,727 | 10/1970 | Grunwald et al. | 8/938 |
| 3,951,598 | 4/1976 | Arashi et al. | 8/499 |
| 5,092,907 | 3/1992 | Riblet et al. | 8/617 |
| 5,509,940 | 2/1992 | Zbar et al. | 8/617 |

FOREIGN PATENT DOCUMENTS

93/17166  9/1993  WIPO.

*Primary Examiner*—Paul Lieberman
*Assistant Examiner*—Caroline L. Dusheck
*Attorney, Agent, or Firm*—Wayne E. Nacker; Gerald K. White

[57] ABSTRACT

Water-immiscible solvent dyes are mixed with citrus solvents and non-ionic surfactants to form a water-reducible true dye solution containing at least 35 wt % of the water-immiscible dye. The dye solution is dispersible in water and infinitely reducible.

2 Claims, No Drawings

WATER-REDUCIBLE DYE COMPOSITIONS COMPRISING SOLVENT DYES AND CITRUS SOLVENTS

This is a continuation in part of application Ser. No. 08/214,334 filed Mar. 16, 1994, now abandoned, which is a Continuation-In-Part of U.S. Ser. No. 08/063,833 filed May 18, 1993, now abandoned.

The present invention is directed to water-reducible dye compositions which, upon mixing with water, form aqueous dispersions of the dyes and to the aqueous dispersions formed therefrom.

BACKGROUND OF THE INVENTION

There are a wide variety of types of dyes which are water-immiscible. A major advantage of water-immiscible dyes is that such dyes tend to be permanent, at least with respect to exposure to water. A disadvantage of such dyes is that they require organic solvent carriers, such as xylene, which are problematic from a health and environmental standpoint.

The present invention is directed to compositions of water-immiscible dyes which form stable dispersions in aqueous media and therefor provide the permanence of water-immiscible dyes without the accompanying disadvantage of containing substantial amounts of harmful organic solvent carriers.

For many industrial applications, such as for forming inks, high dye loadings are required. Dye solutions typically must be formulated with a variety of additional ingredients which dilute the coloring effect of the dye; hence, the need for high dye loading. Furthermore, the solvent used to dissolve the dye may not be desirably used at a high level in the formulation. Accordingly, it is a further object of the invention that the water-reducible dye solutions have high dye loadings.

SUMMARY OF THE INVENTION

A water-reducible dye solution of the present invention comprises between about 35 wt % and about 70 wt % of a) a water-immiscible solvent dye or mixture of solvent dyes, at least about 25 wt % of said dye solution being a solvent dye or mixture of solvent dyes selected from the dye types consisting of azo dyes, phthalocyanine dyes, and anthraquinone dyes; between about 10 and about 64 wt % of b) a solvent system for said water-immiscible dye or dye mixture in sufficient quantities to dissolve said water-immiscible dye or dye mixture, said solvent system comprising between about 30 and about 100 wt % of b1) a citrus solvent(s) and b2) between 0 and about 70 wt % of a compatible co-solvent(s) which is either water-immiscible or water-immiscible; and c) between about 1 and about 55 wt % of a non-ionic surfactant. When mixed into water, the water-reducible solutions form stable micro dispersions of the water-immiscible dye solutions in the water, which dispersions are infinitely reducible. The dyes of such aqueous dispersions become permanently fixed to the material to which they are applied.

DETAILED DESCRIPTION OF THE PREFERRED EMBODIMENTS

Solvent dyes are dyes that have at least some solubility in one or more organic solvents in which solvent the dye may be dissolved and by which the cye may be carried to the substrate. Solvent dyes are completely or substantially immiscible in water. Solvent dyes are discussed more fully in *Colour Index International*, 3rd ed., Additions and Amendments no. 67, April 1988, p. 147–148.

The water-immiscible solvent dyes which comprise at least 25 wt % of the dye solutions of the present invention are of the dye types:

1. Azo dyes which includes monoazo, disazo and tetrazo's of both the metallized and non-metallized varieties. Metallized dyes are typically described as amine salts of monatomic metal chelates with one or two molecules of dye, depending upon the metal used. Non-metallized azo dyes include guanidine salt types typical of the Luxol$^R$ product line. Specific examples of water-immiscible azo dyes include but are not limited to are:
   1—Automate® Black 104 =color index (c.i.) Solvent Black 49 =benzene azobenzene naphthyl benzene-amino hydroxy, alkyl derivatives/alkylamino-cuprate. CAS Accession # 56918.
   2—Automate® Yellow D—c.i. Solvent Yellow, 4—(2-hydroxy-5-nonylphenylazo)-[N-[4—(2-hydroxy-5-nonylphenylazo)-phenyl]]benzamide. CAS # PMN Notice No. P-91-890.
   3—Automate® Red B=c.i. Solvent Red 164=2-naphthalenol(phenylazo)phenyl azo alkyl derivatives. CAS #=TSCA accession # 35371.
   4—Morfast® Red 101 =c.i. Solvent Red 68=1,3-naphthalenedisulfonic acid, 7-hydroxy-8-4-(phenyl-azo) phenyl azo-, compound with 2-ethyl-N-(2-ethylhexyl)-1-hexanamine (1:2). CAS #=68555-82-8.
   5—Morfast® Black 101 =c.i. Solvent Black 48 =cobaltate bis-2, 2'dioxy-4-di 2"-hydroxy-3"-alkyloxy-propyl amino-4-phenylazo-5-methyl-azobenzene, hydrogen dibutanammonium salt.
   6 —Luxol® Brown K=c.i. Solvent Brown 20=1,3-naphthalenedisulfonic acid,7,7' (4,6-dihydroxy-1,3-phenylene) bis (azo) bis arylguanidine salt. CAS # 72208-28-7.
   7-Automate® Yellow 126—c.i. Solvent Yellow 126= 1,3 benzenediol, 2,4-bis (alkyl phenyl) azo-. CAS # 29190-28-1; 65087-00-5; and 68310-04-3. 8—c.i. Solvent Brown 52 =ferrate bis-2,2'dioxy-4-di 2"-hydroxy-3"alkoxy-propyl amino-5'-chloroazobenzene, hydrogen dibutanammonium salt. CAS" 111559-76-3.

2. Phthalocyanine derived dyes, mainly of the sulfonated versions derived from coppered pigments. Specific examples include but are not limited to:
   1—Morfast® Blue 100 =c.i. Solvent Blue 129 =cuprate (2-), 29H, 31H phthalocyanine disulfonato (4-) N29, N30, N31, N32 di-1-alkanammonium, -N-(alkyl) salt CAS # 68155-92-0.
   2—Luxol® Blue MBSN=c.i. Solvent Blue 38 =cuprate (2-), 29H, 31H-phthalocyanine-disulfonato (4)-N29, N30, N31, N32-arylguanidine salt. CAS # 1328-51-4.

3. Anthraquinones, predominantly, mono, di and mixed substituted alkylamino derivatives as well as mono, di and mixed substituted arylamino types. Specific examples include but are not limited to:
   1—Automate® Blue 8 =c.i. Solvent Blue 98=1,4-dialkylamino anthraquinone. CAS # 74499-36-8.
   2—Automate® Green 5 =c.i. Solvent Green 5=9,10-anthracenedione, 1,4-bis [(alkylphenyl) amino] anthraquinone. CAS # : none assigned.
   3—BASF's Flussig Blue 672 =c.i. Solvent Blue 79= 1,4-dialkoxyamino anthraquinone.

Other solvent dyes used in solvent dye solutions in accordance with the invention, if not of one of the dye types listed above, used in admixture with a dye or dyes of the type(s) mentioned above include, but are not limited to (according to their color index designations): Solvent Violet 9, CAS # 467-63-0; Solvent Black 7, CAS # 8005-03-5; Solvent Blue 100, CAS # 71819-50-6; Solvent Orange 97, CAS # 92257-04-0; and Solvent Red 49, CAS # 509-34-2.

The term "Citrus Solvent" is used herein inclusively to include chemicals defined as citrus peel oils, terpene, terpinene, and dipentene. The definitions of these classes in Hawley's Condensed Chemical Dictionary, Eleventh Edition overlap:

"Citrus Peel Oils"- Edible oils expressed from the peel or rind of grapefruit, lemon, lime, orange and tangerine; Constituents: limonene, citral, and terpenes in varying percentages.

"Terpene"- $C_{10}H_{16}$ An unsaturated hydrocarbon occurring inmost essential oils and oleoresins of plants. The terpenes are based on the isoprene unit $C_5H_8$, and may be either acyclic or cyclic with one or more benzenoid groups. There are classified as monocyclic (dipentene), dicyclic (pinene) or acyclic Myrcene, according to the molecular structure.

"Terpinene"- $C_{10}H_{16}$ A mixture of three isomeric cyclic terpenes, alpha, beta and gamma terpinene.

"Dipentene"- (cinene; limonene, inactive; dl-p-mentha-1, 8-diene; cajputene); Commercial form is high in dipentene content, but also contains other terpenes and related compounds in varying amounts.

"Limonene"- a widely distributed optically active terpene, closely related to isoprene. It occurs naturally in both D- and L- forms. The racemic mixture of two isomers is known as dipentene.

Citrus solvents are found to be particularly useful solvents in providing dispersions of a wide variety of dyes. In addition, citrus solvents are non-toxic, environmentally safe and biodegradable. The citrus solvent may comprise 100% of the solvent of the water-reducible dye composition, or may be admixed with a co-solvent up to a 30/70 citrus solvent/co-solvent wt. ratio, preferably one which is likewise non-toxic and environmentally benign. Examples of suitable co-solvents include but are not limited to ethyl lactate, butyl lactate, propylene glycol, triethanolamine, methyl ethyl ketone, ethanol, methanol, diethanolamine, methyl lactate, xylene, 1-methoxy-2-propanol, 2-methoxy-1-propanol.

The third essential component is a non-ionic surfactant. Suitable surfactants include fatty acid esters; polyoxyethylated nonyl phenol derivatives; Rhone Poulene—CO-720 and CO630 nonylphenoxypoly (ethyleneoxy) ethanol CAS # 9016-45-9; Union Carbide—Tergitol D-683 alkoxylated alkylphenol CAS # 37251-69-7; Rhone Poulene—Alkamide 2106 modified coconut diethanolamide CAS # 68603-42-9; Rhone Poulene—Alkamuls EL-985 polyethoxylated caster oil CAS # 75-21-8; and Morton International—Sotex N long chain fatty acid esters.

The specific solvent dyes discussed above can be loaded in citrus solvent compositions to high levels, i.e., at least about 35 wt % and some up to about 70 wt %. This high loading is unexpected. U.S. Pat. No. 5,092,907 describes dispersions of pigments in terpene oil. It also suggests that soluble dyes may be dissolved in terpene oil, but to a maximum of 30%. Thus that it is found that loading levels of 35 wt % or greater of particular dyes and dye mixtures in citrus solvents can be achieved is unexpected. As stated above, high dye levels are advantageous in that the industry requires high dye loadings, particularly for dye compositions which will be subsequently diluted by other components of particular formulations.

These components a)–c) are blended together to form a stable water-reducible true dye solution in accordance with the present invention. The dye solution is typically provided free of water for shipment and storage. The end user adds the dye solution to water (or aqueous medium) with appropriate agitation to produce a dispersion of the dye solution in water (or aqueous medium). Generally, stable dispersions are achieved at a 1:1 ratio of water reducible dye solution to water. However, the dye solution can accommodate more or less water, so as to provide the dye content the user desires.

Aqueous dispersions of the dye solution of the present invention can be used for example in felt tip pens, ball point pens, printing inks, hand stamps, ink jet inks, coatings, paints and woodstains.

The invention will now be described in greater detail by way of specific examples.

EXAMPLE 1

To a 1 liter round bottom flask was charged 200 grams of a xylene solution of benzene azobenzene naphthyl benzeneaminohydroxy, alkyl derivatives/alkylaminocuprate. The dye was heated to 120° C. under full vacuum to distill out all xylene (approximately 48%). The xylene is replaced with 90 grams ATR-High Flash$^R$ citrus solvent and 10 grams long chain fatty acid ester.

This solution when mixed with 204 ml. water with stirring formed a dispersion of the dye solution.

EXAMPLE 2

A water-reducible solution was prepared in the manner of Example 1 containing 40 wt % 4-(2-hydroxy-5-nonylphenylazo)-[N[4-(2-hydroxy-5-nonylphenylazo)-phenyl]] benzamide, 36 wt % ATR-P citrus solvent and 24 wt % Igepal$^R$ CO630.

EXAMPLE 3

A water-reducible solution was prepared in the manner of example 1 containing 35 wt % 1,4 dialkylamino anthraquinone, 46 wt % Vortex$^R$ citrus solvent and 19 wt % long chain fatty acid ester.

EXAMPLE 4

A water-reducible solution was prepared in the manner of Example 1 containing 40 wt % cuprate (2-), 29H, 31H phthalocyanine disulfonato (4-) N29, N30, N31, N32 di-1-alkanammonium, -N-(alkyl) salt, 20 wt % butyl lactate, 20 wt % Vortex$^R$ citrus solvent, 5 wt % long chain fatty acid ester, 10 wt % triethanol amine, and 5 wt % Pegospherse$^R$ dispersing agent.

EXAMPLE 5

A water-reducible solution was prepared in the manner of Example 1 containing 46 wt % cobaltate bis-2,2"dioxy-4-di 2"-hydroxy-3"-alkyloxy-propyl amino-4-phenylazo-5-methyl-azobenzene, hydrogen dibutanammonium salt, 40 wt % dipentene and 14 wt % long chain fatty acid ester.

Commercial citrus solvent/surfactant compositions useful in the present invention are analyzed as follows:

ATR-C: The major component appears to be limonene. The surfactant was identified as a mixture of ethoxylated alkyl phenols with the average structure $C_{12.7}H_{26.4-p}C_6H_4$-O-$(CH_2CH_2$-O$)_7H$. Assuming an average molecular weight of 580, the surfactant was estimated to be approximately 7 wt % of the sample.

Vortex: This sample appears to be very similar to ATR-C. The major component is limonene; the surfactant appears to be a mixture of ethoxylated alkyl phenols.

ATR-HI FLASH: The major component is terpinolene. The surfactant was identified as an ethoxylated alkyl phenol with an average surface structure $C_{17.7}H_{36.8-p}C_6H_4\text{-O-}(CH_2CH_2\text{-O})_{5.3}H$.

IGEPAL 630: this sample was a surfactant that was known to be an ethoxylated alkyl phenol. NMR spectra determined an average structure $C_{8.7}H_{18.5-p}C_6H_4\text{-O-}(CH_2CH_2\text{-O})_{8.6}H$.

ATR-P: The NMR spectra of this sample are very complex. The terpenoid component is a complex mixture, containing limonene as well as many other components. An ethoxylated surfactant appears to be present at a higher level in this sample. The ethoxylated segments appear to contain some oxymethylene groups. The surfactant may be an ethoxylated alkyl phenol, but due to the complexity of the spectra and the diversity in the structures, positive identification is very difficult. A small carbonyl component, possibly an ester, was also detected in this sample.

Dipentene: This sample also appears to be quite complex. The terpenoid solvent contains limonene as well as a number of other components. Its distribution is somewhat similar to that of ATR-P. The surfactant in this sample is similar to that of ATR-P. No carbonyl component was detected.

What is claimed is:

1. A water-reducible dye solution comprising between about 35 wt % and about 70 wt % of a) a water immiscible solvent dye or mixture of solvent dyes, at least about 25 wt % of said dye solution being an azo, pthalocyanine, or anthraquinone solvent dye selected from the group consisting of Solvent Black 49 (CAS Accession # 56918), Solvent Yellow (CAS # PMN Notice No. P-91-890), Solvent Red 164 (CAS #=TSCA Accession # 35371), Solvent Red 68 (CAS # 68555-82-8), Solvent Black 48 (cobaltate bis-2,2'-dioxy-4-di-2"-hydroxy-3"-alkyloxy-propyl amino-4-phenylazo-5-methyl-azobenzene, hydrogen dibutanammonium salt), Solvent Brown 20 (CAS # 72208-28-7), Solvent Yellow 126 (CAS # 29190-28-1; 65087-00-5 and 68310-04-3), Solvent Brown 52 (CAS # 111559-76-3), Solvent Blue 129 (CAS # 69155-92-0), Solvent Blue 38 (CAS # 1328-51-4), Solvent Blue 98 (CAS # 74499-36-8), Solvent Green 5 (9,10-anthracenedione-1,4-bis-{(alkylphenyl)amino}anthraquinone), Solvent Blue 79 (1,4-dialkoxyamino anthraquinone), and mixtures thereof;

between about 10 and about 64 wt % of b) a solvent system for said water-immiscible solvent dye or mixture of dyes in sufficient quantities to dissolve said water-immiscible solvent dye or mixture of solvent dyes, said solvent system comprising between about 30 and about 100 wt % of b1) a citrus solvent or mixture of citrus solvents and b2) between 0 and about 70 wt % of an additional solvent or mixture of additional solvents which is either water-miscible or water-immiscible; and c) between about 1 and about 55 wt % of a non-ionic surfactant.

2. The composition of claim 1 dispersed in an aqueous medium.

* * * * *